(No Model.)
S. ANDERSON.
UNDERGROUND CONDUIT FOR ELECTRIC WIRES.
No. 261,979. Patented Aug. 1, 1882.
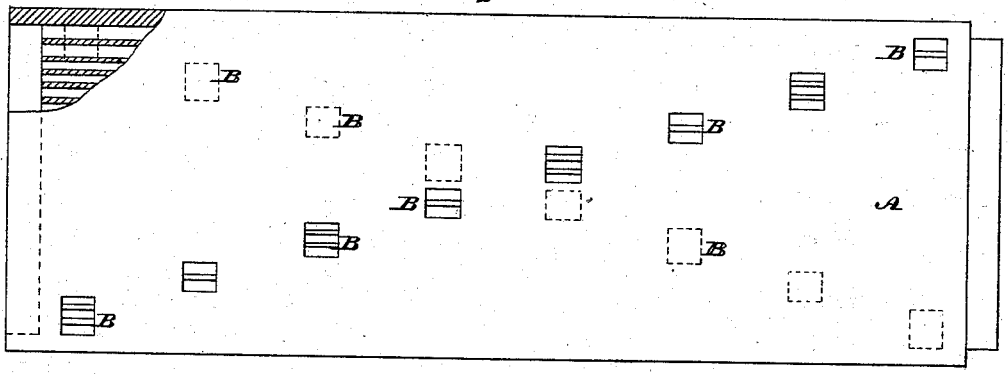
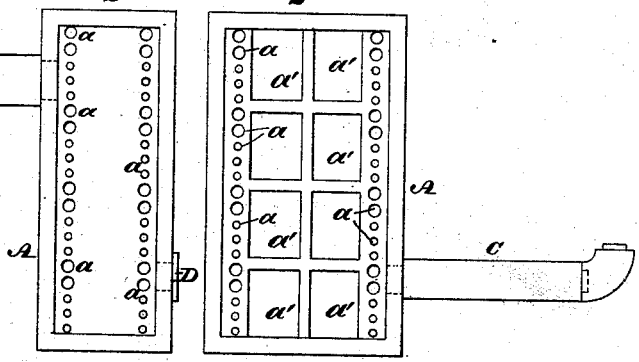
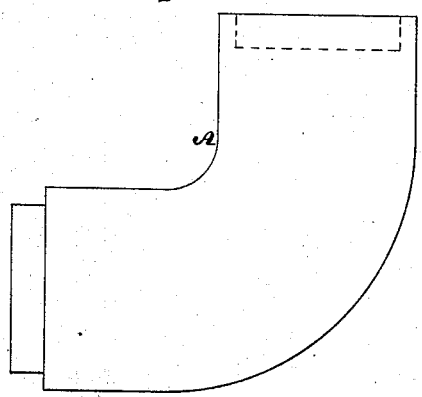
WITNESSES:
R. P. Grant,
W. F. Kircher
INVENTOR:
Samuel Anderson,
BY John A. Wiedersheim,
ATTORNEY.

UNITED STATES PATENT OFFICE.

SAMUEL ANDERSON, OF PHILADELPHIA, PENNSYLVANIA, ASSIGNOR OF SEVENTEEN THIRTY-SECONDS TO WILLIAM ALLEN AND ALEXANDER C. McCURDY, OF SAME PLACE.

UNDERGROUND CONDUIT FOR ELECTRIC WIRES.

SPECIFICATION forming part of Letters Patent No. 261,979, dated August 1, 1882.

Application filed March 10, 1882. (No model.)

*To all whom it may concern:*

Be it known that I, SAMUEL ANDERSON, a citizen of the United States, residing in the city and county of Philadelphia, State of Pennsylvania, have invented a new and useful Improvement in Underground Conduits for Electric Wires, which improvement is fully set forth in the following specification and accompanying drawings, in which—

Figure 1 is a side view, partly broken away, of the conduit embodying my invention. Figs. 2 and 3 are end views thereof. Fig. 4 is a top view of a bend of the conduit.

Similar letters of reference indicate corresponding parts in the several figures.

My invention consists of certain improvements in conduits for electric wires, whereby the conduits possess great strength, and the wires are properly supported and readily accessible for making side connections, and other advantages are presented, as will be stated.

Referring to the drawings, A represents a conduit, which is formed of a block of glass, terra-cotta, iron, or other suitable material, which is longitudinally pierced, as at *a a*, forming ducts or openings, which are arranged one above the other and adapted to receive electric wires. In both sides of the conduit are series of lateral openings, B, which are formed with the block during the manufacture of the same, each series of openings extending in a diagonal direction, the series of one side, furthermore, extending in a reverse direction to the series of the other side. Each opening B leads directly into one of the ducts *a a*, and in practice the openings are sufficiently large to communicate with two adjacent ducts, and thus expose the wires therein, as seen in Fig. 1. These openings B are adapted for making side connections for telegraph, telephone, and electric-light purposes in houses, the sidewalk, and other localities, for which purpose I employ branches C, which are fitted to the respective openings B and conduct the wires from the main conduit. The openings B which are not in use or have no connected branches are occupied by plugs D, which are tightly and securely fitted in position, so as to prevent the entrance of water, &c., into the conduit A.

In Fig. 3 I show a conduit which is wider than the one shown in Fig. 2, and it is provided with the ducts *a a* on each side, and intermediate thereof are tiers of passages *a'*, which are more especially designed for conducting wires to greater distances than those placed in the ducts *a*, the latter being employed for local purposes.

The conduits A are properly laid coupled, and have their joints suitably cemented. The wires are introduced into the ducts and passages *a a*, and provision made for the necessary insulation. Bends or elbows are coupled with the conduits wherever required, and testing-stations formed at desired localities.

When it is required to make connection with either of the ducts *a a* the ground is dug from the side of the conduit until the proper opening B is reached, the plug thereof is removed, the branch fitted in position, and the connection made, the other plugs not being disturbed. The nature of the wires run through the ducts is predetermined. Hence there will be no difficulty in digging to the proper opening B. The large ducts are employed for wires for telegraph, telephone, &c.

As each side of the conduit has its range of ducts *a*, provision is made for running wires for each side of the road or street. Hence connections may be made on the right-hand side of the conduit without disturbing the ground on the opposite side, and vice versa. Furthermore, the wires are properly separated, and confusion in locating them and afterward reaching them is prevented. The blocks are likewise strong and durable and firmly sustain the wires, and the diagonal arrangements of the openings B on opposite sides of the conduit in reversed order prevent weakening of the sides of the conduit, as said reversed order of the diagonally-arranged openings serves to break joints, as the openings are not at coincident places, excepting it may be at the center and ends, and this may be avoided by properly adjusting the position of all the openings, the diagonal arrangement and reversed order thereof being preserved.

Having thus described my invention, what I claim as new, and desire to secure by Letters Patent, is—

1. The block having ducts $a$, with lateral communicating openings and passages $a'$ intermediate of the ducts, substantially as and for the purpose set forth.

2. The block having lateral openings in each side which communicate with the longitudinal ducts of the block, located diagonally in reverse order on opposite sides of the block, substantially as and for the purpose set forth.

SAMUEL ANDERSON.

Witnesses:
JOHN A. WIEDERSHEIM,
A. P. GRANT.